US012148406B2

(12) United States Patent
Vara et al.

(10) Patent No.: US 12,148,406 B2
(45) Date of Patent: Nov. 19, 2024

(54) CELLO KNEE GUARD

(71) Applicants: Florentina Maria Vara, Pacific Palisades, CA (US); Circe Diaz Gamero, Los Angeles, CA (US)

(72) Inventors: Florentina Maria Vara, Pacific Palisades, CA (US); Circe Diaz Gamero, Los Angeles, CA (US)

( * ) Notice: Subject to any disclaimer, the term of this patent is extended or adjusted under 35 U.S.C. 154(b) by 79 days.

(21) Appl. No.: 17/973,757

(22) Filed: Oct. 26, 2022

(65) Prior Publication Data

US 2023/0132341 A1 Apr. 27, 2023

Related U.S. Application Data

(60) Provisional application No. 63/272,310, filed on Oct. 27, 2021.

(51) Int. Cl.
*G10D 3/18* (2020.01)

(52) U.S. Cl.
CPC .................................... *G10D 3/18* (2013.01)

(58) Field of Classification Search
CPC .. G10D 3/18; G10D 1/02; G10D 3/00; G10D 1/00
See application file for complete search history.

(56) References Cited

U.S. PATENT DOCUMENTS

| | | | | |
|---|---|---|---|---|
| 7,205,468 | B1 * | 4/2007 | Johnson | G10G 5/005<br>84/421 |
| 9,495,945 | B1 * | 11/2016 | George | G10G 5/005 |
| 10,629,174 | B1 * | 4/2020 | White | G10D 1/08 |

* cited by examiner

*Primary Examiner* — Kimberly R Lockett

(74) *Attorney, Agent, or Firm* — Gutwein Law; Tyler B. Droste

(57) ABSTRACT

Described herein is cushioned guarding device configured for removable receipt onto a side wall of a musical instrument for providing a padded surface for contact between the instrument and the body side of a user. The cushioned device is generally sided with a first side utilizing a tackified surface or indent to adhere to the instrument and the second side including a projection that is generally comfortable and soft and provides a cushioned contact point between the instrument and a player.

19 Claims, 8 Drawing Sheets

CELLO KNEE GUARD

CROSS REFERENCE TO RELATED APPLICATIONS

This application claims priority to U.S. Provisional Patent Application No. 63/272,310 filed 27 Oct. 2021 to the above named inventors, and is herein incorporated by reference in its entirety.

FEDERALLY SPONSORED RESEARCH OR DEVELOPMENT

Not Applicable

SEQUENCE LISTING, A TABLE, OR A COMPUTER PROGRAM

Not Applicable

FIELD OF THE INVENTION

The invention relates generally to a guarding device configured for placement on a musical instrument for protecting both the instrument and a player of the instrument. More, particularly, the invention relates to a removable device configured for placement onto a cello exterior surface or body portion to generally provide cushion to a player and aid in securing a cello between the knees of the player during playing of the instrument.

BACKGROUND

Several musical instruments utilize a playing style, wherein a portion of the musical instrument is rested against or held against a body portion of a user or player of the instrument. In fact, some instruments, such as, the violin, are commonly provided with a resting surface, such as a chin pad, to aid in use and protection of the surface of the instrument.

One particular instrument that is rested against the body of a player is the rather large sized stringed instrument of the cello. In a typical playing style for a cello, the instrument is placed between the knees of a seated player and rested against the knee area during playing. As this instrument is rested against this body region for extended periods of time during playing, this knee region can become bruised, sore, tired, or otherwise uncomfortable. Current solutions generally require a user to wear a cushioned or padded device against their body or to place a pad or pillow between their knees and instrument during playing. Although useful, these current solutions are not configured for securing upon the instrument nor are they provided in a specific assembly having a gripping component/surface to aid in securing the instrument while also providing comfort, they are not provided in a specific assembly and materials that do not damage or mar the instrument, and are generally not considered inconspicuous, wherein the current solutions are easily visible to an observer.

SUMMARY OF THE INVENTION

It would be advantageous to have an apparatus that is specifically configured as a padded device for placement on a musical instrument, such as, but not limited to a cello during use to provide comfort to a user of the instrument and additionally protect the instrument from marring or damage during playing. In a preferred embodiment of the present disclosure, the apparatus is provided in a removable and self-adhesive assembly. Still further, it is preferred that the apparatus utilize materials and a structure is at least translucent and preferably transparent so as to preserve the beauty and finish of an instrument it is used upon, wherein the apparatus is generally hidden from view due to its translucent features. Furthermore, it would also be advantageous to have an apparatus that is provided in a material that could be described as resilient or flexible, wherein it can conform to multiple instrument shapes and anatomical shapes and sizes.

The invention advantageously fills the aforementioned deficiencies by providing a cello knee guard, which provides protection for a user while playing a cello.

The apparatus is comprised of a material and structure that is configured to adhere to the instrument in a non-marring or damaging manner.

The apparatus is provided in multiple sizes to accommodate various sizes of user's and instruments.

The apparatus fulfills the need for knee protection during playing a cello.

Among other things, it is an advantage of the invention to provide a cello knee guard that does not suffer from any of the problems or deficiencies associated with prior solutions.

It is still further an advantage of the invention to be reusable.

Still further, in the preferred assembly, the apparatus is comprised of a silicone material to provide a cushioned gripping surface.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

Figure 1:
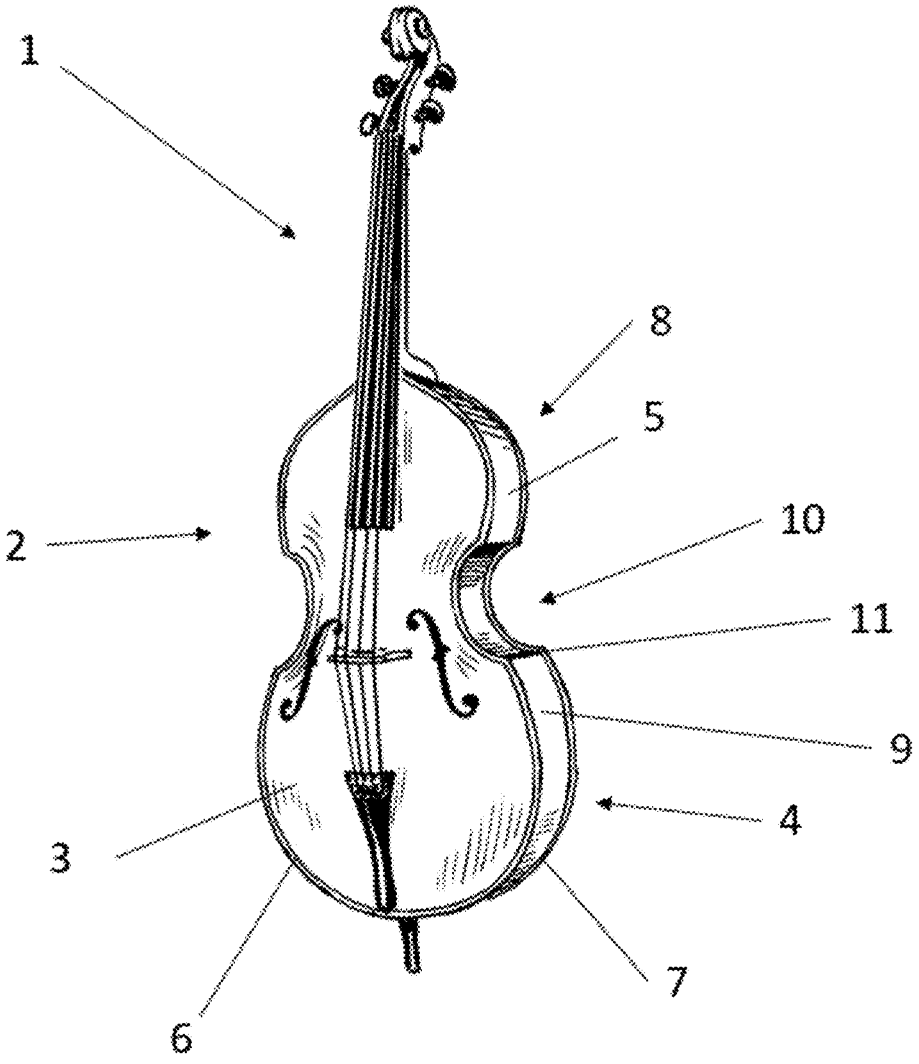
(PRIOR ART) FIG. 1
FIG. 1 is a isometric view cello stringed musical instrument as is commonly found in the prior art.
Figure 2:
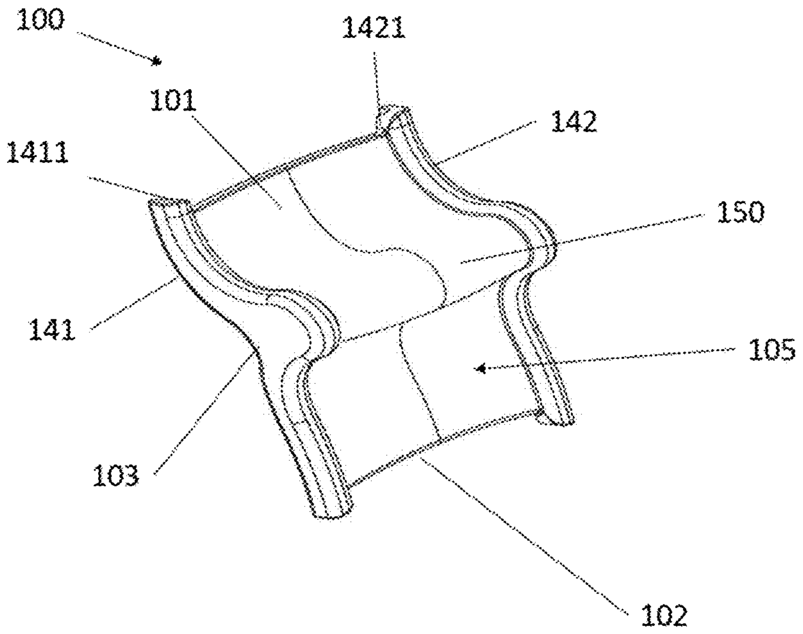
FIG. 2 is an isometric view of the cushioned device, according to the present disclosure.
Figure 3:
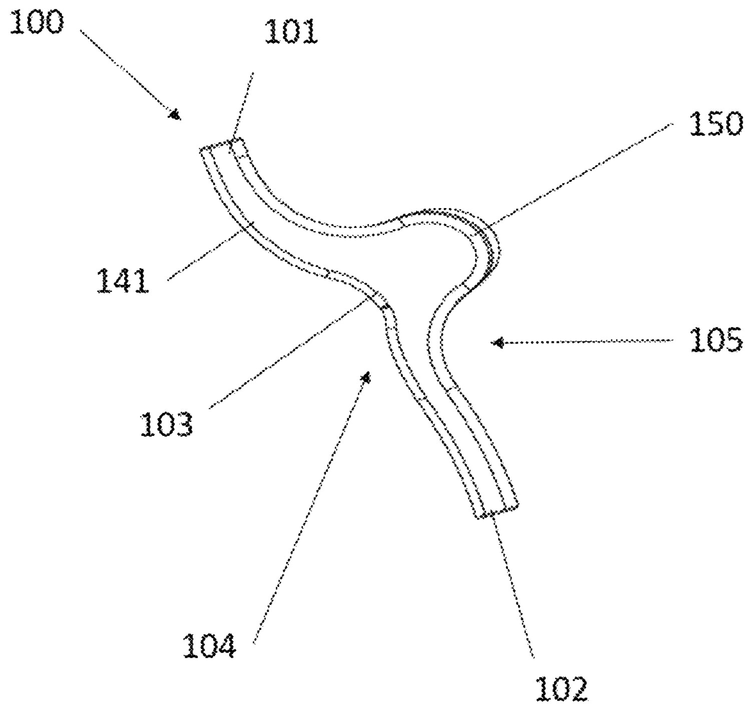
FIG. 3 is a side view of the cushioned device, according to the present disclosure.
Figure 4:
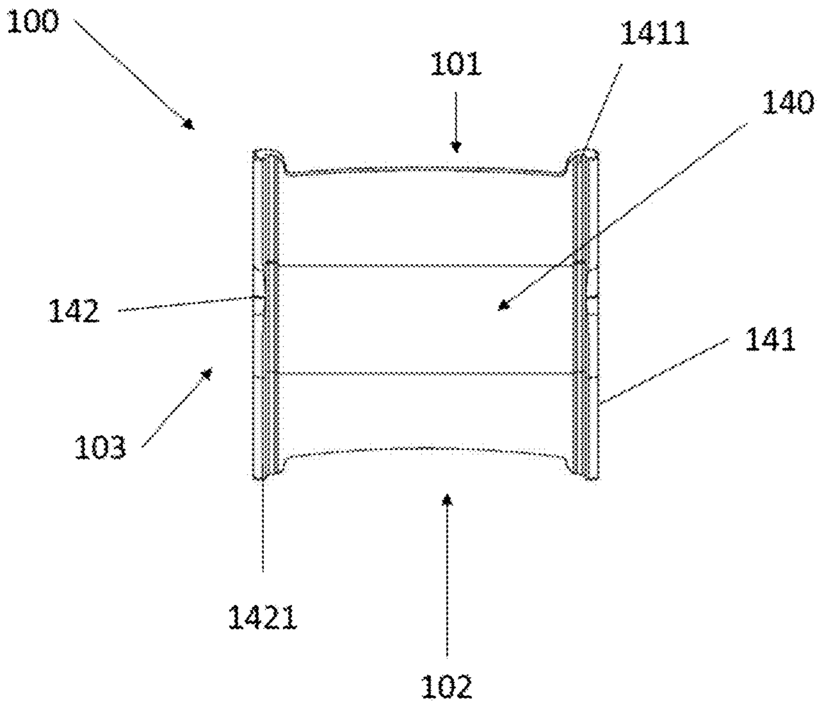
FIG. 4 is a view of a first side of the cushioned device, according to the present disclosure.
Figure 5:
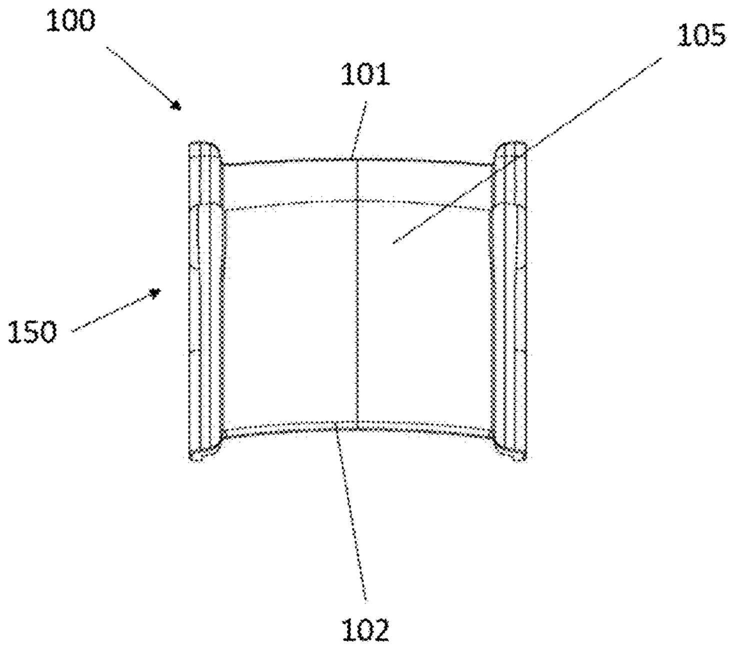
FIG. 5 is a view of a second side of the cushioned device, according to the present disclosure.
Figure 6:
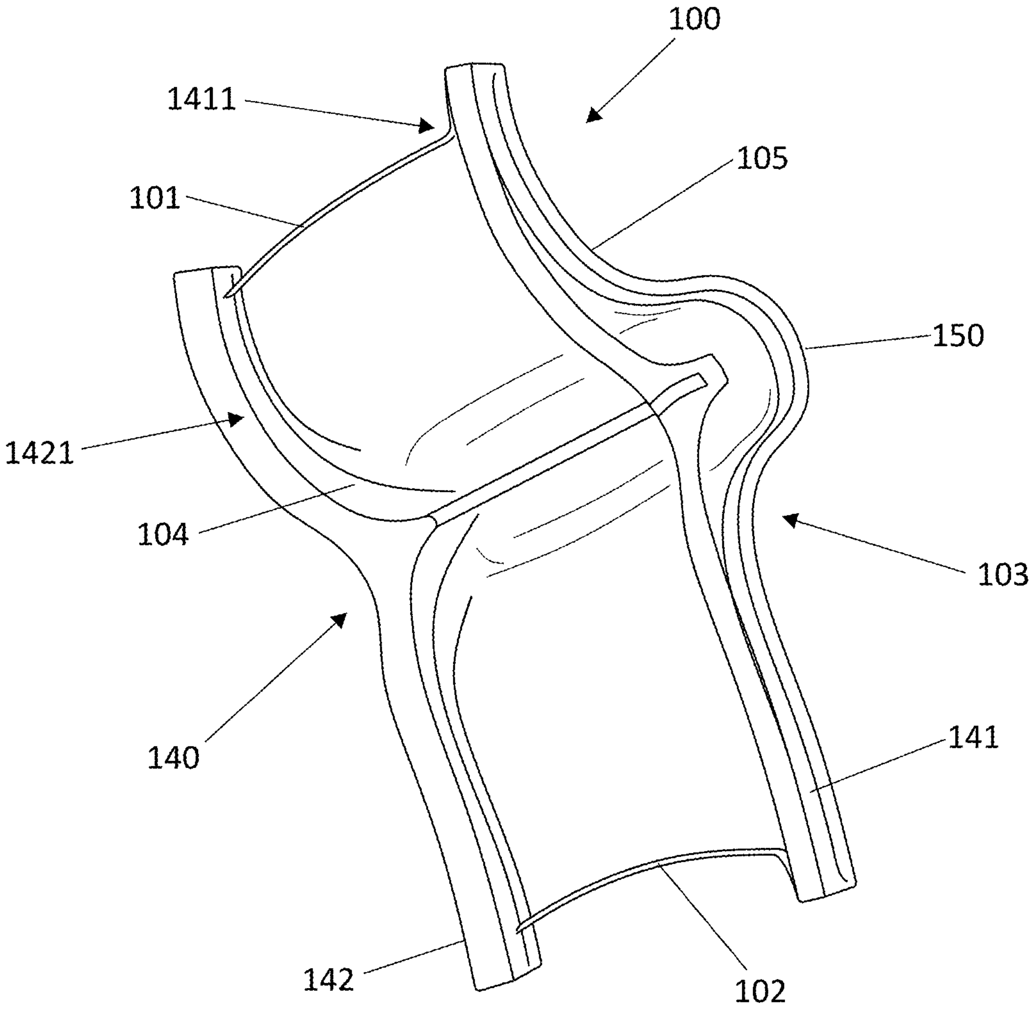
FIG. 6 is an isometric view of the first side of the cushioned device, according to the present disclosure.
Figure 7:
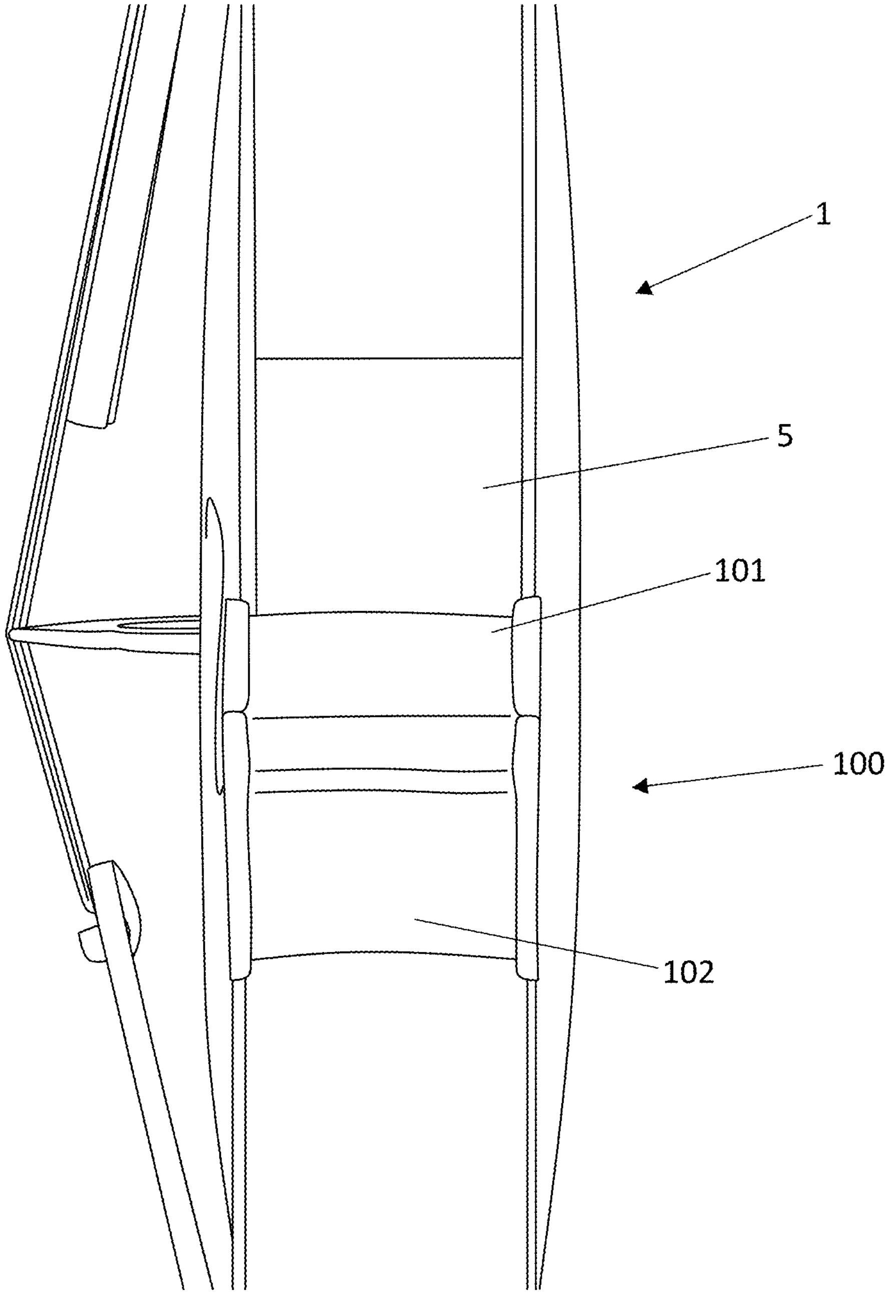
FIG. 7 is an isometric view of the cushioned device installed on a musical instrument, according to the present disclosure.

The following detailed description includes references to the accompanying drawings, which forms a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention of this disclosure is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful and is not intended to exclude other embodiments from the scope of the invention.

As used herein, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The invention can most generically be described as padded or cushioned guarding device configured for placement along a side of a musical to protect the knee area of a player during use.

Referring to the figures, FIG. 1 shows a stringed musical instrument in the form of a cello 1 that is generally and commonly found in the prior art. The cello 1 is comprised of a hollow body portion 2 having a specific shape to resonate and amplify the attached strings. This body portion 2 includes a front side 3 and a rear side 4. The font side 3 and the rear side 4 are connected with a side wall 5 generally defining a thickness of the cello 1 and extending around the entire shape of the cello 1. Generally, the side wall 5 and front side 3 and rear side 4 coupling includes a first ridge 6 between the front side 3 and the wall 5 and a second ridge 7 between the side wall 5 and the rear side 4. This first ridge 6 and the second ridge 7 typically extend around the entire shape of the body portion 2 of the cello 1. The specific shape of the cello 1 includes an upper bout 8, a lower bout 9, and a middle bout 10 or waist generally connecting the upper bout 8 and the lower bout 9. The middle bout 10 or waist is often referred to as the center cut or C-bout and generally represents a recess in the shape to allow a player easier access to the strings during play and additionally provides an area for resting against a body of the player. Accordingly, and due to the shape of the middle bout 10 and the lower bout 9 a corner 11 is formed. This corner 11 is often utilized as a resting surface during playing and often can provide discomfort during playing of the cello 1 due to its relatively sharp and angular projective nature.

Referring now to FIGS. 2-7 of a cushioned device or apparatus in the form of a cello knee guard and generally referred to herein as the device 100. The device 100 is generally a softened structural apparatus having a flexible and resilient shape to conform to the side wall of a musical instrument, such as, but not limited to a cello 1. Accordingly and preferably, the device 100 is constructed from a flexible and resilient material, such as, but not limited to a silicone-based material, that includes a reusable component that is tacky or utilizes an adhesive or adhesive-like material for generally adhering and fixing the device 100 securely to the instrument 1. The device 100 material properties of softness and resiliency is accomplished by utilizing a material that could be considered as extra soft or soft on the Shore 00 hardness scale having a Shore 00 hardness between 10 and 70. When measured on a Shore A hardness scale, the material of the device 100 could be considered as extra soft or soft and having a measured Shore A range between 0 and 30. For universal use, it is critical that any a reusable component that is tacky or utilizes an adhesive or adhesive-like material is provided in a composition that will not mar or damage the finish and materials of the instrument the device 100 is used upon. In the preferred assembly, the device 100 is provided in a transparent or translucent assembly to blend in and not detract from the natural beauty of the instrument 1 the device 100 is placed upon. The device 100 is selected to have a universal size and a shape that generally conforms to the side wall of the musical instrument the device 100 is placed upon. In the preferred embodiment, the device 100 is sided and dimensioned such that placement is only capable in on direction and in one way to ensure a proper fit and placement.

Accordingly, the device 100 includes a first end 101 generally representing the top of the device 101 and opposed a second end 102 generally representing a bottom of the device 100. A distance between the first end 101 and the second end 102 defining a length of the cushioned device 100. A middle portion 103 is positioned between the first end 101 and the second end 102, this middle portion 103 generally aligns with a central position relative to the length of the cushioned device 100.

The device 100 includes a first side 104 and a second side 105 opposite the first side 104. The first side 104 is configured for placement and securing along the exterior surface of the musical instrument and along the length of the device 100. This first side 104 is generally configured to affix or be secured to the instrument the device 100 is placed upon. In an embodiment of the present disclosure, this first side 104 may include a tacky or tackified surface, wherein the device 100 is configured to stick or adhere to the surface of the instrument. This tacky surface is specifically selected and adapted to allow for reuse and replacement of the device 100 on the instrument along the first side 104 during use. In a preferred assembly, this tacky surface along the first side 104 does not use a material, such as a solvent or agent, that is considered harmful to a finish on the musical instrument. In other embodiments of the present disclosure, the first side 104 may include a silicone-based gel or silicone-based material for providing adhesion of the device 100 to the instrument. Alternate to a specific tackified material, gel, adhesive, or silicone-based material, the device 100 first side 104 itself may utilize a material that may have inherent adhesion properties for gripping the instrument.

The second side 105 of the device 100 is cushioned to provide a softened and comfortable surface against a body side of a user or the player of the musical instrument the device 100 is placed upon. The second side 105 extends outward relative to the first side at the middle portion 103 to form a projection 150. The projection 150 is a cushioned, arcuate, and bulbous shape configured to provide a purchase for contact by the user. The projection 150, accordingly, is the main area or position contacted by the user of the musical instrument during playing to provide a comfortable support.

For use on a cello 1 or other similar instrument, the device 100 may include additional securing features and structures to enable adherence of the device 100 in a relatively inconspicuous and flush manner. According to this embodiment, the first side 104 includes a first indent 140 with the first indent 140 being a recessed space extending across a width of the cushioned device 100 perpendicular to the length and having a size and a shape selected to receive the corner 11 between the middle bout 10 and the lower bout 9, wherein the cushioned device 100 is configured for placement over the corner 11. The first indent 140 relief or cavity space allows for the receipt of the corner 11 into the first indent 140 to allow for a flush or flush-like mounting of the cushioned device 100 against the exterior side of the instrument.

For a cello 1 or musical instrument having the first ridge 6 and the second ridge 7, the height of each of the first ridge 6 and the second ridge 7 presents additional issues when trying to securely affix the device 100 against the side wall 5 in a tight and flush manner. To accommodate the raised surfaces of the first ridge 6 and the second ridge 7, the device 100 first side 104 includes a first groove 1411 and a second groove 1421 generally positioned with the first groove 1411 along a first edge 141 and the second groove 1421 along a second edge 142. The first edge 141 and the second edge 142 being the edges of the device 100 and extend from the first end 101 to the second end 102. Accordingly, the first groove 1411 and the second groove 1421 each extend the entire length of the device 100 from the first end 101 to the second end 102 to generally receive either the first ridge 6 or the second ridge 7. The first groove 1411 and the second groove 1421 each are a recessed space to provide relief, similar to the first indent 140, having a size and shape to receive the first ridge 6 or the second ridge 7. Accordingly, the device 100 placement in alignment with the exterior side of the instrument in a flush manner will result in the first ridge 6 being received in the first groove 1411 and the second ridge 7 being received in the second groove 1421 to accommodate the mounting of the cushioned device 100 against the exterior side wall 5.

The device 100 is configured to be provided in a generally universal size to accommodate a plurality of common stringed instrument sizes, shapes, and types. Further, the device 100 material properties of resiliency, flexibility, and durometer also allow for this universal size wherein the device 100 can be moved, flexed, or molded to accommodate these various instrument 100 sizes and shapes.

Figure 8:
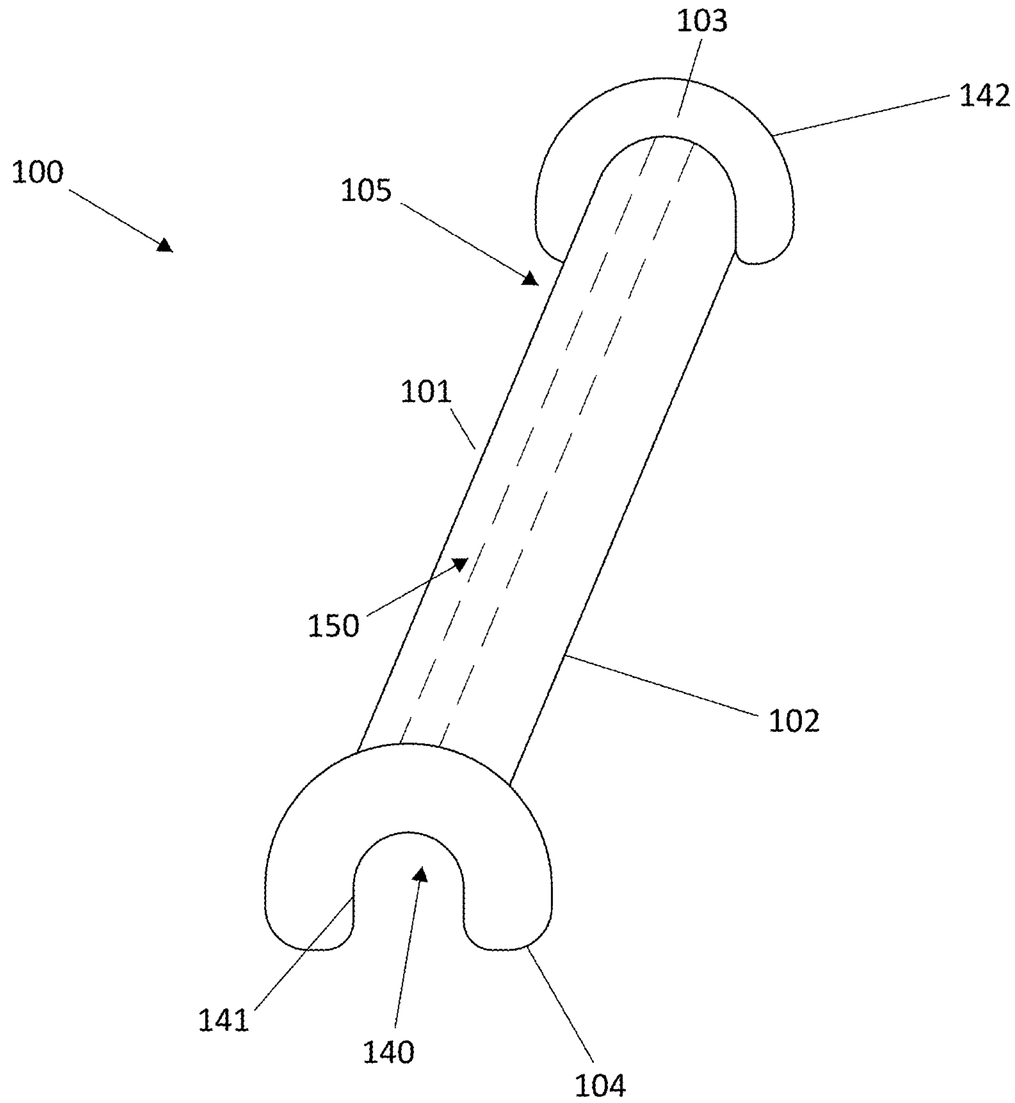
FIG. 8 is an isometric view of an alternate embodiment of the cushioned device, according to the present disclosure.

Referring now to FIG. 8, an alternate embodiment of the present disclosure, the device 100 is provided in a generally smaller and condensed assembly, wherein the device 100 is specifically adapted for securing upon the corner 11 of the middle bout 10 and the lower bout 9 between the front 3 and rear 4 of the body portion 2 of the musical instrument the device 100 is installed upon. In this embodiment, the device 100 generally adopts the first indent 140 as the area for securing the device 100 along the first side 104. According to this embodiment of the device 100, the first end 101 and the second end 102 distance apart is relatively condensed to only extend around the corner 11. In this embodiment the middle portion 103 is generally smaller relative to the preferred embodiment with the projection 150 generally being an arched and softened surface and not as bulbous. The second side 105 projection 150 cushioned surface helps to generally soften the typical corner 11 and provides a comfortable resting surface for a user of the device 100. According to this embodiment, the device may utilize a foam material with the first indent 140 generally being a channel having a size and shape to receive the corner 11.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A cushioned device for placement on an exterior surface of a musical instrument, the cushioned device comprising:

a first end, the first end being the top of the cushioned device;

a second end, the second end a distance from the first end culminating in a bottom of the cushioned device, the distance defining a length of the cushioned device;

a middle portion, the middle portion positioned between the first end and the second end along the length, wherein the middle portion is generally aligned with a central position relative to the length of the cushioned device;

a first side, the first side configured to be secured along the exterior surface of the musical instrument along the length of the cushioned device;

a second side opposite the first side, the second side cushioned and generally extending outward relative to the first side at the middle portion to form a projection;

the projection being a cushioned shape to provide a surface for contact by a user, wherein the projection is the surface contacted by the user of the musical instrument during playing to provide a cushioned resting support.

2. The cushioned device as in claim 1, wherein the cushioned device is comprised of a translucent material.

3. The cushioned device as in claim 1, wherein the cushioned device is comprised of a transparent material.

4. The cushioned device as in claim 1, wherein the device is comprised of a silicone based material.

5. The cushioned device as in claim 1, wherein the first side includes a tacky surface, the tacky surface being selected to allow for reuse and replacement, wherein this tacky surface does not use a material that is harmful to a finish on the musical instrument.

6. The cushioned device as in claim 5, wherein the tacky surface is a silicone-based gel.

7. A reusable cushioned apparatus adapted for placement on an exterior side surface of a cello stringed instrument, the cushioned apparatus comprising:

a first end, the first end being the top of the apparatus;

a second end, the second end a distance from the first end culminating in a bottom of the apparatus, the distance defining a length of the apparatus;

a middle portion, the middle portion positioned between the first end and the second end along the length, wherein the middle portion is generally aligned with a central position relative to the length of the apparatus;

a first side, the first side having a tackified surface configured to be secured along the exterior surface of the musical instrument along the length of the cushioned apparatus;

a second side opposite the first side, the second side cushioned and generally extending outward relative to the first side at the middle portion to form a projection;

the projection being a cushioned, arcuate, and bulbous shape to provide a surface for contact by a user, wherein the projection is the surface contacted by the user of the musical instrument during playing to provide a cushioned resting support.

8. The reusable cushioned apparatus as in claim 7, wherein the cushioned apparatus is comprised of a translucent material.

9. The reusable cushioned apparatus as in claim 7, wherein the cushioned apparatus is comprised of a transparent material.

10. The reusable cushioned apparatus as in claim 7, wherein the cushioned apparatus is comprised of a silicone based material.

11. A cushioned device adapted for placement on an exterior side surface of a cello stringed instrument, the cello stringed instrument exterior side having at least a middle bout, a lower bout, and a corner between the middle bout and the lower bout, the cushioned apparatus comprising:

a first end, the first end being the top of the device, the first end positioned on the middle bout during use;

a second end, the second end a distance from the first end culminating in a bottom of the device, the distance defining a length of the device, the second end positioned on the lower bout during use;

a middle portion, the middle portion positioned between the first end and the second end along the length, wherein the middle portion is generally aligned with a central position relative to the length of the device, the middle portion positioned on the corner between the middle bout and the lower bout;

a first side, the first side configured to be secured along the exterior surface of the musical instrument along the entire length of the cushioned apparatus;

a second side opposite the first side, the second side cushioned and generally extending outward relative to the first side at the middle portion to form a projection outward from the corner between the middle bout and the lower bout;

the projection being a cushioned, arcuate, and bulbous shape to provide a surface for contact by a user, wherein the projection is the surface contacted by the user of the musical instrument during playing to provide a cushioned resting support.

12. The cushioned device as in claim 11, wherein the first side includes a first indent, the first intent being a recessed space extending across a width of the cushioned device perpendicular to the length and having a size and a shape selected to receive the corner, wherein the cushioned device is configured for placement over the corner with the corner received in the first indent to allow for flush mounting of the cushioned device against the exterior side.

13. The cushioned device as in claim 12, wherein the cello stringed instrument includes a first ridge positioned between a front side and the exterior side, the first ridge generally being a seam between the front side and the exterior side, and a second ridge positioned between a back side and the exterior side, the second ridge generally being a seam between the back side the exterior side, wherein the first side includes a first groove and a second groove, the first groove positioned along a first edge and extending from the first end to the second end, the first groove being a recessed space having a size and shape to receive the first ridge, the second groove positioned along a second edge and extending from and the first end to the second end, the second groove being a recessed space having a size and a shape to receive the second ridge, wherein the cushioned device is configured for placement in alignment with the exterior side of the cello stringed instrument and over the first ridge and the second ridge, wherein the first ridge is received in the first groove and the second ridge is received in the second groove to allow for flush mounting of the cushioned device against the exterior side and extending over the first ridge and the second ridge.

14. The cushioned device as in claim 11, wherein the cushioned device is comprised of a translucent material.

15. The cushioned device as in claim 11, wherein the cushioned apparatus is comprised of a transparent material.

16. The cushioned device as in claim 11, wherein the cushioned apparatus is comprised of a silicone based material.

17. The cushioned device as in claim 11, wherein the first side includes a tacky surface, the tacky surface being selected to adhere the device to the cello stringed instrument and allow for reuse and replacement, wherein this tacky surface does not use a material that is harmful to a finish on the cello stringed instrument.

18. The cushioned device as in claim 17, wherein the tacky surface is a silicone-based gel.

19. The cushioned device as in claim 11, wherein the tacky surface is a silicone-based adhesive.

* * * * *